United States Patent
Laas et al.

(10) Patent No.: US 6,426,414 B1
(45) Date of Patent: Jul. 30, 2002

(54) POLYETHER-MODIFIED POLYISOCYANATE MIXTURES HAVING IMPROVED DISPERSIBILITY IN WATER

(75) Inventors: Hans-Josef Laas, Köln; Reinhard Halpaap, Odenthal; Christian Wamprecht, Neuss, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/312,180

(22) Filed: May 14, 1999

(30) Foreign Application Priority Data

May 22, 1998 (DE) .......................... 198 22 891
Oct. 14, 1998 (DE) .......................... 198 47 077

(51) Int. Cl.$^7$ .................... C07C 271/66; C07C 275/60; C07C 269/00; C07C 273/00; C07D 251/34
(52) U.S. Cl. .............. 544/222; 252/182.2; 252/182.21; 252/182.22; 528/49; 528/55; 528/67; 528/73; 560/25; 560/26; 560/115; 560/158; 560/166; 560/330; 560/336; 560/355; 564/44; 564/45
(58) Field of Search .................. 252/182.2, 182.21, 252/182.22; 528/49, 55, 67, 73; 544/222; 560/25, 26, 115, 158, 166, 330, 336, 355; 564/44, 45

(56) References Cited

U.S. PATENT DOCUMENTS

| | | | |
|---|---|---|---|
| 4,160,080 A | 7/1979 | Koenig et al. ............... 528/59 |
| 4,433,095 A | 2/1984 | Hombach et al. ........... 524/563 |
| 4,663,377 A | 5/1987 | Hombach et al. ........... 524/196 |
| 4,810,820 A | 3/1989 | Slack et al. .................... 560/27 |
| 5,086,175 A | 2/1992 | Minato et al. ............... 544/221 |
| 5,200,489 A | 4/1993 | Jacobs et al. .................. 528/49 |
| 5,252,696 A | 10/1993 | Laas et al. ..................... 528/49 |
| 5,380,792 A | * 1/1995 | Renk ........................... 524/840 |
| 5,468,804 A | 11/1995 | Schmalstieg et al. ....... 524/591 |
| 5,473,011 A | * 12/1995 | Laas et al. |
| 5,503,714 A | 4/1996 | Reiners et al. ........... 162/164.6 |
| 5,563,207 A | 10/1996 | Brahm et al. ............... 524/591 |
| 5,583,176 A | 12/1996 | Haberle ...................... 524/591 |
| 5,718,804 A | 2/1998 | Jansen et al. ............ 162/164.6 |
| 5,723,536 A | 3/1998 | Baumbach et al. ......... 524/591 |
| 5,731,396 A | * 3/1998 | Laas et al. ..................... 528/49 |
| 6,007,619 A | * 12/1999 | Laas et al. .................. 106/727 |
| 6,008,289 A | * 12/1999 | Konig et al. ................ 524/591 |

FOREIGN PATENT DOCUMENTS

| | | |
|---|---|---|
| CA | 2148783 | 11/1995 |
| EP | 0 95 594 | 8/1986 |
| EP | 0 524 500 | 1/1993 |
| EP | 0 835 889 | 4/1998 |

* cited by examiner

*Primary Examiner*—Rabon Sergent
(74) *Attorney, Agent, or Firm*—Joseph C. Gil; Thomas W. Roy

(57) ABSTRACT

The present invention relates to water dispersible polyisocyanate mixtures prepared from aliphatic, cycloaliphatic, araliphatic and/or aromatic diisocyanates and having a) an average isocyanate functionality of at least 2.0, b) a content of 5.0 to 25.0 wt. %, based on resin solids, of isocyanate groups (calculated as NCO; molecular weight=42) and c) a content of 2 to 50 wt. %, based on resin solids, of ethylene oxide units calculated as $C_2H_4O$; molecular weight 44) incorporated within polyether chains containing an average of 5 to 35 ethylene oxide units, wherein at least 60 mole % of the polyether chains are connected via allophanate groups to two polyisocyanate molecules which are each prepared from at least two diisocyanate molecules. The present invention also relates to a process for the preparation of these water dispersible polyisocyanate.

16 Claims, No Drawings

POLYETHER-MODIFIED POLYISOCYANATE MIXTURES HAVING IMPROVED DISPERSIBILITY IN WATER

BACKGROUND OF THE INVENTION

1. Field of the Invention

The present invention relates to polyether-modified, water dispersible polyisocyanate mixtures and to a process for their preparation.

2. Description of the Prior Art

Water dispersible polyisocyanates are gaining increasing importance for various fields of use. Water dispersible polyisocyanates play a particular role as crosslinker components for water dilutable two-component polyurethane (2K PU) paints. In combination with aqueous polyol dispersions, they allow the formulation of solvent-free paint systems which are curable at room temperature and provide high-quality coatings which are not inferior to conventional paints with regard to solvent resistance, chemical resistance and mechanical stability. Examples of these compositions are described, e.g., in EP-A 358,979, EP-A 469,389, EP-A 496,210, EP-A 542,105, EP-A 543,228, EP-A 562,282, EP-A 562,436, EP-A 583,728, DE-A 4,129,951, DE-A 4,226,242, DE-A 4,226,243 or DE-A 4,226,270.

Water dispersible polyisocyanates are also of importance as additives e.g. for aqueous adhesive dispersions. They can be used to considerably increase the heat stability and resistance to water of different glued materials as described, e.g., in EP-A 61,628 and EP-A 206,059.

Water dispersible polyisocyanates are also used as crosslinkers for aqueous dispersions in textile treatment (EP-A 560 161 or WO 95/30045) or in formaldehyde-free textile free printing inks (EP-A 571,867 or DE-A 19,533,218). They are also suitable as additives for wet strength treatment of paper (EP-A 564,912, EP-A 582,166. EP-A 707,113, WO 96/20309 and WO 97/04169).

Nonionic polyisocyanates hydrophilically modified with polyethers have found acceptance for all these fields of use in practice. The preparation of such water dispersible polyisocyanates is described in a number of publications.

According to the teachings of DE-A 2,415,435, for example, urethanes from organic, in particular aromatic polyisocyanates and polyethylene glycol monoalkyl ethers containing at least 5 ethylene oxide units are surface-active substances which, according to GB-PS 1,444,933 and DE-A 2,908,844, allow the preparation of stable aqueous emulsions of aromatic polyisocyanates.

Aromatic polyisocyanates hydrophilically modified by reaction with alkylene oxide polyethers are also known from EP-A 61,628 and 95,594. These products are used in the form of aqueous emulsions in particular in the adhesives sector.

Water dispersible formulations of (cyclo)aliphatic polyisocyanates are known, e.g., from EP-A 206,059. They are based on the reaction products of polyisocyanates with mono- or polyhydric polyalkylene oxide alcohols containing at least one polyether chain containing at least 10 ethylene oxide units, and also serve as additives for aqueous adhesives.

EP-A 516,277 describes the hydrophilic modification of special polyisocyanates containing tertiary isocyanate groups by reaction with monofunctional polyalkylene oxide polyethers and the use of these products as crosslinkers for aqueous coating compositions.

For high quality light-fast paints, the polyisocyanate mixtures, which are described in EP-B 540,985 and U.S. Pat. No. 5,200,489 and obtainable by the urethanization of aliphatic and/or cycloaliphatic lacquer polyisocyanates with short-chain polyethylene oxide polyether alcohols containing an average of less than 10 ethylene oxide units, have proved suitable.

The water dispersible polyisocyanates, which are based on 2,4(6)-diisocyanatotoluene (TDI) or mixtures of TDI and 1,6-diisocyanatohexane (HDI) and are known from EP-A 645,410 and EP-A 680,983 as crosslinking agents for aqueous wood and furniture paints, also contain urethanes from polyisocyanate and monofunctional polyethylene oxide polyether alcohols as hydrophilic components.

In addition to these purely nonionic, hydrophilic polyisocyanates containing polyether-urethanes, polyether-modified water dispersible polyisocvanates which additionally also contain ionic groups are also known, e.g., those containing sulfonate groups (cf. e.g. EP 703,255) or amino or ammonium groups (cf. e.g. EP-A 582,166 and EP-A 707,113), and may be used to improve the emulsifiability or to achieve special effects. Such ionically/nonionically modified polyisocyanates are generally less suitable for paint uses. They are preferably employed in environment-friendly textile treatment or as wet strength agents for paper.

In spite of their very diverse uses, the water dispersible polyisocyanates of the prior art modified with polyether-urethanes have a number of disadvantages. The water dispersible polyisocyanates, which have been prepared using higher molecular weight polyether alcohols (e.g., those having an average molecular weight of approx. 700 in the case of pure polyethylene oxide polyethers), often can only be incorporated homogeneously into aqueous media using considerable shear forces (e.g., high-speed stirrers) because of a very high viscosity maximum which has to be overcome during the dispersing step. Also, such products often tend to crystallize, especially at the high emulsifier contents that are necessary to achieve particularly finely divided, sedimentation-stable dispersions.

Water dispersible polyisocyanates, which can be stirred manually very easily into water to give stable dispersions and show no tendency to crystallize even at high degrees of hydrophilic modification, i.e. at high contents of ethylene oxide units, can be obtained using shorter polyether chains. However, because of the relatively low molecular weight of the polyalkylene oxide polyethers employed for the modification, both the content of isocyanate groups and the average isocyanate functionality decrease constantly with the increasing degree of hydrophilization. In practice it is precisely these highly hydrophilic polyisocyanates with high NCO contents and the highest possible functionality, which are desired for the majority of the previously mentioned fields of use, for example, as crosslinkers for paints and coatings.

Therefore, an object of the present invention is to provide new water dispersible polyisocyanate mixtures which are suitable for use in the previously mentioned applications for hydrophilic polyisocyanates, in particular as starting components for the preparation of polyurethane plastics, and above all as crosslinking agents for aqueous binders in coating compositions, and which do not have the disadvantages mentioned for the water dispersible polyisocyanates of the prior art.

This object may be achieved with the polyisocyanate mixtures according to the invention and the process for their preparation. The polyisocyanate mixtures according to the invention are based on the surprising observation that the reaction of low monomer-containing polyisocyanates prepared from at least two diisocyanate molecules with monofunctional polyethylene oxide polyether alcohols under allophanate-forming conditions gives water dispersible polyisocyanate mixtures which can already be stirred considerably more easily and in a more finely divided form into aqueous systems at significantly lower degrees of hydrophilic modification than the prior art water dispersible polyisocyanates which have been prepared using polyether alcohols of identical construction and in which the polyether chains are linked to the polyisocyanate via urethane bonds.

The process according to the invention allows the preparation of hydrophilic polyisocyanates which are stable to crystallization and are distinguished by a higher content of isocyanate groups and a higher functionality, coupled with the same or an even better water dispersibility, when compared with the known polyisocyanate mixtures containing polyether chains.

EP-A 000,194, EP-A 303,150, EP-A 682,012, U.S. Pat. No. 5,380,792 and U.S. Pat. No. 5,086,175, which are directed to the preparation of polyisocyanates containing allophanate groups, disclose the use of the known polyether alcohols as suitable alcoholic starting compounds for the preparation of such products. In addition, EP-A 000,194, EP-A 303,150 and EP-A 682,012 disclose polyisocyanates having a functionality of >2 (such as trimerization products of HDI or 1-isocyanato-3,3,5-trimethyl-5-isocyanatomethyl-cyclohexane (IPDI)) within long lists of suitable starting isocyanates. However, it is not disclosed in any of the these publications that reaction products, which are prepared under allophanatization conditions from low monomer-containing polyisocyanates and monofunctional polyethylene oxide polyether alcohols, can be stirred into water to give stable emulsions, considerably more easily and in a more finely divided form than polyisocyanate mixtures of the same empirical composition which have been prepared by known prior art processes and incorporate the polyether by urethanization.

SUMMARY OF THE INVENTION

The present invention relates to water dispersible polyisocyanate mixtures prepared from aliphatic, cycloaliphatic, araliphatic and/or aromatic diisocyanates and having a) an average isocyanate functionality of at least 2.0, b) a content of 5.0 to 25.0 wt. %, based on resin solids, of isocyanate groups (calculated as NCO; molecular weight=42) and c) a content of 2 to 50 wt. %, based on resin solids, of ethylene oxide units calculated as $C_2H_4O$; molecular weight 44) incorporated within polyether chains containing an average of 5 to 35 ethylene oxide units, wherein at least 60 mole % of the polyether chains are connected via allophanate groups to two polyisocyanate molecules which are each prepared from at least two diisocyanate molecules.

The present invention also relates to a process for the preparation of these water dispersible polyisocyanate mixtures by reacting A) a polyisocyanate component of having an average NCO functionality of 2.0 to 5.0 and having a content of aliphatically, cycloaliphatically, araliphatically and/or aromatically bound isocyanate groups (calculated as NCO; molecular weight=42) of 8.0 to 27.0 wt. % and a content of monomeric diisocyanates of less than 1 wt. % with B) a monofunctional polyalkylene oxide polyether alcohol having an average of 5 to 35 ethylene oxide units, at an NCO/OH equivalent ratio of 6:1 to 400:1 such that at least 60% of the urethane groups initially formed by the NCO/OH reaction are converted to allophanate groups.

DETAILED DESCRIPTION OF THE INVENTION

Component A) to employed in the process according to the invention has an average NCO functionality of 2.0 to 5.0, preferably 2.3 to 4.5; a content of isocyanate groups of 8.0 to 27.0 wt. %, preferably 14.0 to 24.0 wt. %; and a content of monomeric diisocyanates of less than 1 wt. %, preferably less than 0.5 wt. %. Component A) contains at least one organic polyisocyanate having aliphatically, cycloaliphatically, araliphatically and/or aromatically bound isocyanate groups.

The polyisocyanates or polyisocyanate mixtures of component A) include any polyisocyanates which are prepared from at least two aliphatic, cycloaliphatic, araliphatic and/or aromatic diisocyanates, and contain uretdione, isocyanurate, allophanate, biuret, imino-oxadiazinedione and/or oxadiazinetrione groups. These polyisocyanates are described, for example, in J. Prakt. Chem. 336 (1994) 185–200, DE-A 1,670,666, 1,954,093, 2,414,413, 2,452,532, 2,641,380, 3,700,209, 3,900,053 and 3,928,503 as well as EP-A 336, 205, 339,396 and 798,299.

Suitable diisocyanates for the preparation of these polyisocyanates are those which have a molecular weight of 140 to 400, are obtained by phosgenation or by phosgene-free processes (for example, by thermal urethane cleavage) and have aliphatically, cycloaliphatically, araliphatically and/or aromatically bound isocyanate groups. Examples include 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanato-cyclohexane, 1,3- and 1,4-bis-(isocyanatomethyl)-cyclohexane, 1-isocyanato-3,3,5-trimethyl-5-isocyanatomethyl-cyclohexane (isophoronediisocyanate, IPDI), 4,4'-diisocyanato-dicyclohexylmethane, 1-isocyanato-1-methyl-4(3)-isocyanatomethyl-cyclohexane, bis-(isocyanatomethyl)-norbornane, 1,3- and 1,4-bis-(2-isocyanato-prop-2-yl) benzene (TMXDI), 2,4- and 2,6-diisocyanatotoluene (TDI), 2,4'- and 4,4'-diisocyanatodiphenyl methane, 1,5-diisocyanato-naphthalene and mixtures thereof.

Starting components A) are preferably polyisocyanates or polyisocyanate mixtures having exclusively aliphatically and/or cycloaliphatically bound isocyanate groups. Especially preferred starting components A) are polyisocyanates or polyisocyanate mixtures containing isocyanurate groups and prepared from HDI, IPDI and/or 4,4'-diisocyanatodicyclohexylmethane.

Component B) is selected from monofunctional polyalkylene oxide polyether alcohols or mixtures thereof containing an average of 5 to 35, preferably 7 to 30 ethylene oxide units per molecule. They may be obtained in known manner by the alkoxylation of suitable starter molecules as described, e.g., in Ullmanns Encyclopädie der technischen Chemie [Ullmann's Encyclopaedia of Industrial Chemistry], 4th edition, volume 19, Verlag Chemie, Weinheim p. 31–38).

Suitable starter molecules for the preparation of polyether alcohols B) include saturated monoalcohols such as methanol, ethanol, n-propanol, isopropanol, n-butanol, isobutanol, sec-butanol, the isomeric pentanols, hexanols, octanols or nonanols, n-decanol, n-dodecanol, n-tetradecanol, n-hexadecanol, n-octadecanol, cyclohexanol, the isomeric methylcyclohexanols or hydroxymethylcyclohexanes, 3-ethyl-3-hydroxymethyloxetane and tetrahydrofurfuryl alcohols; unsaturated alcohols such as allyl alcohol, 1,1-dimethylallyl alcohol and oleyl alcohol; phenols such as phenol, the isomeric cresols and methoxyphenols; araliphatic alcohols such as benzyl alcohol, anisyl alcohol and cinnamyl alcohol; secondary monoamines such as dimethylamine, diethylamine, dipropylamine, diisopropylamine, dibutylamine, diisobutylamine, bis-(2-ethylhexyl)-amine, N-methyl- and N-ethylcyclohexylamine and dicyclohexylamine; and heterocyclic secondary amines such as morpholine, pyrrolidine, piperidine and 1H-pyrazole.

Preferred starter molecules are saturated monoalcohols having up to 4 carbon atoms. Methanol is especially preferred as the starter molecule.

Alkylene oxides which are suitable for the alkoxylation reaction are preferably ethylene oxide and propylene oxide, which can be employed in the alkoxylation reaction in any desired sequence or also as a mixture. The polyalkylene oxide polyether alcohols B) are either pure polyethylene oxide polyethers or mixed polyalkylene oxide polyethers wherein at least 30 mole %, preferably at least 40 mole %, of the alkylene oxide units are ethylene oxide units.

Preferred starting components B) for the process according to the invention are pure polyethylene glycol monomethyl ether alcohols which contain an average of 7 to 30, more preferably 7 to 25 ethylene oxide units.

Other compounds which are reactive towards isocyanates and have anionic or cationic groups (for example, carboxylate, sulfonate or ammonium groups) can also optionally be used in minor amounts to provide hydrophilicity in addition to the polyether alcohols B) mentioned.

To carry out the process according to the invention, starting components A) and B) are reacted with one another at temperatures of 40 to 1 80° C., preferably 50 to 150° C., at an NCO/OH equivalent ratio of 6:1 to 400: 1, preferably 8:1 to 140: 1, until at least 60 mole %, preferably at least 80 mole %, and more preferably at least 90 mole %, of the urethane groups initially formed by the NCO/OH reaction are converted to allophanate groups.

Suitable catalysts can optionally be used in the process according to the invention to accelerate the allophanatization reaction. These catalysts are known and include allophanatization catalysts, for example metal carboxylates, metal chelates and tertiary amines such as those described in GB-A 994,890; alkylating agents such as those described in U.S. Pat. No. 3,769,318; and strong acids such as those described in EP-A 000,194.

Examples of these allophanatization catalysts include zinc compounds, such as zinc(II) stearate, zinc(II) n-octanoate, zinc(II) 2-ethyl-1-hexanoate, zinc(II) naphthenate and zinc (II) acetylacetonate; tin compounds, such as tin(II) n-octanoate, tin(II) 2-ethyl-1-hexanoate, tin(II) laurate, dibutyltin oxide, dibutyltin dichloride, dibutyltin diacetate, dibutyltin dilaurate, dibutyltin dimaleate and dioctyltin diacetate; aluminium tri(ethylacetoacetate); iron(III) chloride; potassium octoate; manganese, cobalt or nickel compounds; strong acids such as trifluoroacetic acid, sulfuric acid, hydrogen chloride, hydrogen bromide, phosphoric acid and perchloric acid; and mixtures thereof.

Catalysts which also catalyze the trimerization of isocyanate groups to form isocyanurate groups, in addition to catalyzing the allophanatization reaction, are also suitable, although less preferred, catalysts for the process according to the invention. Such catalysts are described, for example, in EP-A 649 866 page 4, line 7 to page 5, line 15.

Preferred catalysts for the process according to the invention are the previously mentioned zinc compounds. The use of zinc(II) n-octanoate, zinc(II) 2-ethyl-1-hexanoate and/or zinc(II) stearate is especially preferred.

The catalysts are optionally employed in the process according to the invention in an amount of 0.001 to 5 wt. %, preferably 0.005 to 1 wt. % based on the total weight of the reactants.

The addition of the catalyst to the reaction mixture can take place by any desired methods. For example, it is possible to admix the catalyst either with polyisocyanate component A) and/or with polyether component B) before the start of the actual reaction. It is also possible to add the catalyst to the reaction mixture at any time during the urethanization reaction or, in the context of a two-stage reaction procedure, after urethanization, i.e., when the NCO content corresponds to the theoretically complete conversion of isocyanate and hydroxyl groups to urethane groups.

The course of the reaction can be monitored, e.g., by titrimetric determination of the NCO content. When the required NCO content has been reached, preferably when the molar ratio of allophanate groups to urethane groups in the reaction mixture is at least 4:1, more particularly preferably at least 9:1, the reaction is terminated. In a purely thermal reaction procedure, termination can be carried out by cooling the reaction mixture to room temperature. In the preferred use of an allophanatization catalyst, the reaction is in general terminated by the addition of suitable catalyst poisons, e.g., acid chlorides, such as benzoyl chloride or isophthaloyl dichloride.

The amounts of the starting components in the process according to the invention are chosen such that the resulting polyisocyanate mixtures satisfy requirements a) to c) by having an average NCO functionality of at least 2.0, preferably 2.3 to 9.9 and more preferably 2.8 to 5.8; b) an NCO content of 5.0 to 25.0 wt. %, preferably 6.0 to 22.5 wt. % and more preferably 8.5 to 21.5 wt. %; and c) a content of ethylene oxide units incorporated into polyether chains of 2 to 50 wt. %, preferably 5 to 40 wt. % and more preferably 7 to 25 wt. %.

The NCO functionality of the products according to the invention can be determined mathematically from the nature and functionality of the starting components according to the equation $$F = \frac{\sum equiv.NCO - \sum (1+x) \cdot \text{mol OH}}{\sum \left(\frac{equiv.NCO}{f_{NCO}}\right) + \sum \text{mol OH} - \sum (1+x) \cdot \text{mol OH}}$$

wherein x represents the proportion of urethane groups converted into allophanate groups in the process according to the invention. The functionality $f_{NCO}$ of the starting polyisocyanates A) can be calculated from the NCO content and the molecular weight, which can be determined, for example, by gel permeation chromatography (GPC) or vapor pressure osmosis.

The process according to the invention can optionally be carried out in a suitable solvent that is inert towards isocyanate groups. Suitable solvents include known paint solvents such as ethyl acetate, butyl acetate, ethylene glycol monomethyl or -ethyl ether acetate, 1-methoxypropyl-2-acetate, 3-methoxy-n-butyl acetate, acetone, 2-butanone, 4-methyl-2-pentanone, cyclohexanone, toluene, xylene, chlorobenzene, white spirit, more highly substituted aromatics (e.g., those commercially available under the tradenames Solvent naphtha, Solvesso, Shellsol, Isopar, Nappar and Diasol), carbonic acid esters (such as dimethyl carbonate, diethyl carbonate, 1,2-ethylene carbonate and 1,2-propylene carbonate), lactones such as β-propiolactone, γ-butyrolactone, ε-caprolactone and ε-methylcaprolactone), propylene glycol diacetate, diethylene glycol dimethyl ether, dipropylene glycol dimethyl ether, diethylene glycol ethyl and butyl ether acetate, N-methylpyrrolidone, N-methylcaprolactam and mixtures thereof.

The products according to the invention are clear, practically colorless polyisocyanate mixtures which can be dispersed easily in water by mere stirring and without using high shear forces. A considerably lower total content of ethylene oxide units is required to obtain sedimentation-stable aqueous dispersions of a given composition and molecular weight distribution of the polyether segments than in the case of prior art water dispersible polyisocyanate mixtures which have been prepared by urethanization with polyether alcohols of the same composition and molecular weight distribution. The process according to the invention thus allows the preparation of highly hydrophilic polyisocyanates which are stable to crystallization and are distinguished by a higher content of isocyanate groups and a higher functionality, coupled with the same or even better dispersibility in water, compared with the known polyisocyanate mixtures containing polyether urethanes.

The outstanding dispersibility even at low ethylene oxide contents in combination with high NCO contents and functionalities is an advantage in particular for use of the polyisocyanate mixtures according to the invention in aqueous 2C PU paints, since highly crosslinked coatings which have in particular, in addition to a very good resistance to solvents and chemicals, an excellent resistance to water because of the low content of hydrophilic groups can be obtained in this manner.

Non-hydrophilically modified polyisocyanates, in particular the previously mentioned lacquer polyisocyanates, can optionally be added to the polyisocyanate mixtures according to the invention before emulsification. The amounts added are preferably chosen such that the resulting polyisocyanate mixtures satisfy requirements a) to c) and are thus also polyisocyanate mixtures according to the invention. The use of these mixtures is possible since the polyisocyanates according to the invention generally are made up of mixtures of (i) polyisocyanates modified hydrophilically according to the invention and (ii) non-modified polyisocyanates starting materials.

In these mixtures, the process products according to the invention assume the function of an emulsifier for the subsequently admixed content of non-hydrophilic polyisocyanates.

The polyisocyanate mixtures according to the invention are valuable starting materials for the preparation of polyurethane plastics by the isocyanate polyaddition process. In these applications the polyisocyanate mixtures are preferably employed in the form of aqueous emulsions, which can be blended with aqueous polyhydroxy compounds to form two-component compositions and cured.

The polyisocyanate mixtures according to the invention are preferably used as crosslinking agents for paint binders or paint binder components, which are dissolved or dispersed in water and have isocyanate-reactive groups, in particular alcoholic hydroxyl groups. The resulting aqueous coating compositions can be used to produce coatings. The crosslinking agent, optionally in emulsified form, can be combined with the binders by simple stirring before processing of the coating composition or by using two-component spray guns.

Examples of suitable binders which are dissolved or dispersed in water include polyacrylates containing hydroxyl groups, in particular those having a number average molecular weight of 1,000 to 10,000, or the polyester resins containing hydroxyl groups and optionally urethane groups, which are known from polyester and alkyd resin chemistry. Other suitable binders include those which are dissolved or dispersed in water and contain isocyanate-reactive groups, such as polyurethanes or polyureas containing isocyanate-reactive groups.

In the aqueous coating compositions, the polyisocyanate mixtures according to the invention are in present in amounts sufficient to provide an equivalent ratio of NCO groups to isocyanate-reactive groups, in particular alcoholic hydroxyl groups, of 0.5:1 to 2:1.

The polyisocyanate mixtures according to the invention can also be admixed in minor amounts with non-functional aqueous coating compositions to achieve certain properties, for example, as an additive to improve adhesion.

The polyisocyanate mixtures according to the invention can also be employed in blocked form (by reaction with known blocking agents) and used in combination with the previously mentioned aqueous binders to form aqueous one-component PU stoving compositions. Suitable blocking agents include diethyl malonate, acetoacetic acid esters, acetone oxime, butanone oxime, ε-caprolactam, 3,5-dimethylpyrazole, 1,2,4-triazole, dimethyl-1,2,4-triazole, imidazole and mixtures thereof.

Suitable substrates for the aqueous coating compositions containing the polyisocyanate mixtures according to the invention include various substrates, such as metal, wood, glass, stone, ceramic materials, concrete, rigid and flexible plastics, textiles, leather and paper. The substrates can optionally be provided with conventional primers before coating with the compositions according to the invention.

The aqueous coating compositions may also contain known coating additives such as flow control agents, colored pigments, fillers, matting agents and emulsifiers.

The aqueous coating compositions have good paint properties when cured at room temperature. However, they can also be dried under forced conditions at elevated temperature or by stoving at temperatures of up to 260° C.

Because of their outstanding emulsifiability in water, which allows for the formation of a homogeneous, particularly finely divided distribution in aqueous paint binders, the use of polyisocyanate mixtures according to the invention as crosslinker components for aqueous polyurethane paints results in coatings having outstanding optical properties, in particular high surface gloss, flow and high transparency.

In addition to their preferred use as crosslinker components for aqueous 2K PU coating compositions, the polyisocyanate mixtures according to the invention are outstandingly suitable as crosslinking agents for aqueous adhesive dispersions. leather and textile coatings or textile printing pastes, AOX-free paper auxiliaries or as additives for mineral building materials, for example concrete or mortar compositions.

EXAMPLES

The term "degree of allophanatization" means the percentage, which can be calculated from the NCO content, of the urethane groups resulting from reaction between the polyether alcohol and polyisocyanate which have reacted to form allophanate groups. All parts and percentages are by weight unless otherwise indicated.

Example 1

900 g (4.65 eq) of a polyisocyanate, which contained isocyanurate groups, was prepared from 1,6- diisocyanatohexane (HDI) and had an NCO content of 21.7%, an average NCO functionality of 3.5 (according to GPC), a content of monomeric HDI of 0.1% and a viscosity of 3,000 mPa.s (23° C.), were initially introduced into a reaction vessel at 100° C. under dry nitrogen and while stirring. 100 g (0.29 eq) of a mono-functional polyethylene oxide polyether started on methanol and having a number average molecular weight of 350, which corresponded to an NCO/OH equivalent ratio of 16:1, were added over a period of 30 min and stirring was then continued at this temperature until the NCO content of the mixture had fallen, after about 2 h, to a value of 18.3%, which corresponded to complete urethanization. The allophanatization reaction was initiated by the addition of 0.01 g of zinc(II) 2-ethyl-1-hexanoate. During the addition, the temperature of the reaction mixture rose to 106° C. due to the heat of reaction. After the exothermic reaction had subsided, about 30 min after addition of the catalyst, the reaction was terminated by the addition of 0.01 g of benzoyl chloride and the reaction mixture was cooled to room temperature. A practically colorless, clear polyisocyanate mixture was obtained having the following properties:

| Solids content: | 100% |
| NCO content: | 17.2% |
| NCO functionality: | 3.9 |
| Viscosity (23° C.): | 3,200 mPa.s |
| Ethylene oxide content: | 9.1% |
| Degree of allophanatization: | 92% |

Example 2

870 g (4.81 eq) of a polyisocyanate, which contained isocyanurate groups, was prepared from HDI and had an NCO content of 23.2%, an average NCO functionality of 3.2 (according to GPC), a content of monomeric HDI of 0.2% and a viscosity of 1,200 mPa.s (23° C.), were initially introduced into a reaction vessel at 100° C. under dry nitrogen and while stirring. 130 g (0.26 eq) of a monofunctional polyethylene oxide polyether started on methanol and having a number average molecular weight of 500, which corresponded to an NCO/OH equivalent ratio of 18.5:1, were added over a period of 30 min and stirring was then continued at his temperature until the NCO content of the mixture had fallen, after about 2 h, to a value of 19.1%, which corresponded to complete urethanization. The allophanatization reaction was initiated by the addition of 0.01 g of zinc(II) 2-ethyl-1-hexanoate. During the addition, the temperature of the reaction mixture rose to 109° C. due to the heat of reaction. After the exothermic reaction had subsided, about 20 min after addition of the catalyst, the reaction was terminated by the addition of 0.01 g of benzoyl chloride and the reaction mixture was cooled to room temperature. A colorless, clear polyisocyanate mixture was obtained having the following properties:

| Solids content: | 100% |
| NCO content: | 18.0% |
| NCO functionality: | 3.5 |
| Viscosity (23° C.): | 1,400 mPa.s |
| Ethylene oxide content: | 12.2% |
| Degree of allophanatization: | 100% |

Example 3

890 g (2.52 eq) of a polyisocyanate, which was present as a 70% solution in butyl acetate, contained isocyanurate groups, was prepared from IPDI and had an NCO content of 11.9%, an average NCO functionality of 3.3 (according to GPC), a content of monomeric IPDI of 0.2% and a viscosity of 650 mPa.s (23° C.), were initially introduced into a reaction vessel together with a further 47.1 g of butyl acetate at 100° C. under dry nitrogen and while stirring. 110 g (0.22 eq) of a monofunctional polyethylene oxide polyether started on methanol and having a number average molecular weight of 500, which corresponded to an NCO/OH equivalent ratio of 11.5:1, were added over a period of 30 min and stirring, was then continued at this temperature until the NCO content of the mixture had fallen, after about 2.5 h, to a value of 9.7%, which corresponded to complete urethanization. The allophanatization reaction was initiated by the addition of 0.02 g of zinc(II) stearate. During the addition the temperature of the reaction mixture rose to 105° C. due to the heat of reaction. When the exothermic reaction had subsided, about 1 h after addition of the catalyst, the reaction was terminated by the addition of 0.01 g of benzoyl chloride and the reaction mixture was cooled to room temperature. A clear, colorless solution of a polyisocyanate mixture was obtained having the following properties:

| Solids content: | 70% |
| NCO content: | 8.9% |
| NCO functionality: | 3.8 |
| Viscosity (23° C.): | 700 mPa.s |
| Ethylene oxide content: | 9.8% |
| Degree of allophanatization: | 80% |

Example 4

850 g (2.00 eq) of a polyisocyanate, which was present as a 60% solution in butyl acetate, contained isocyanurate groups, had aromatically and aliphatically bound NCO groups, was prepared from 2,4- and 2,6-diisocyanatotoluene (TDI) and FIDI in a molar ratio of 2:1 and had an NCO content of 9.9%, an average NCO functionality of 4.5 (according to GPC), a total content of monomeric diisocyanates (TDI and HDI) of 0.2% and a viscosity of 2,400 mPa.s (23° C.) were initially introduced into a reaction vessel together with a further 46.7 g of butyl acetate at 100° C. under dry nitrogen and while stirring. 70 g (0.14 eq) of a monofunctional polyethylene oxide polyether started on methanol and having a number average molecular weight of 500, which corresponded to an NCO/OH equivalent ratio of 14.3:1, were added over a period of 30 min and stirring was then continued at this temperature until the NCO content of the mixture had fallen, after about 1 h, to a value of 8.1%, which corresponded to complete urethanization. The allophanatization reaction was initiated by the addition of 0.01 g of zinc(II) 2-ethyl-1-hexanoate. During the addition the temperature of the reaction mixture rose to 109° C. due to the heat of reaction. When the exothermic reaction had subsided, about 20 min after addition of the catalyst, the reaction was terminated by the addition of 0.01 g of benzoyl chloride and the reaction mixture was cooled to room temperature. A clear, colorless solution of a polyisocyanate mixture was obtained having the following properties:

| Solids content: | 60% |
| NCO content: | 7.6% |
| NCO functionality: | 5.6 |

-continued

| | |
|---|---|
| Viscosity (23° C.): | 2,600 mPa.s |
| Ethylene oxide content: | 6.8% |
| Degree of allophanatization: | 83% |

Example 5

Comparison with EP-B 540,985 (U.S. Pat. No. 5, 252,696)

900 g (4.65 eq) of the polyisocyanate described in example 1, which contained isocyanurate groups and was prepared from HDI, were initially introduced into a reaction vessel at 100° C. under dry nitrogen and while stirring. 100 g (0.29 eq) of the polyether alcohol described in example 1 were added over a period of 30 min and stirring was continued at this temperature until the NCO content of the mixture had fallen, after about 2 h, to a value of 18.3%, which corresponded to complete urethanization. After cooling to room temperature, a colorless, clear polyisocyanate mixture was obtained having the following properties:

| | |
|---|---|
| Solids content: | 100% |
| NCO content: | 18.3% |
| NCO functionality: | 3.3 |
| Viscosity (23° C.): | 3,100 mPa.s |
| Ethylene oxide content: | 9.1% |
| Degree of allophanatization: | 0% |

Example 6

Comparison with EP-B 540,985 (U.S. Pat. No. 5, 252,696)

860 g (4.44 eq) of the polyisocyanate described in example 1, which contained isocyanurate groups and was prepared from HDI, were initially introduced into a reaction vessel at 100° C. under dry nitrogen and while stirring. 140 g (0.40 eq) of the polyether alcohol described in example 1 were added over a period of 30 min and stirring was continued at this temperature until the NCO content of the mixture had fallen, after about 2 h, to a value of 16.8%, which corresponded to complete urethanization. After cooling to room temperature, a colorless clear polyisocyanate mixture was obtained having the following properties:

| | |
|---|---|
| Solids content: | 100% |
| NCO content: | 16.8% |
| NCO functionality: | 3.2 |
| Viscosity (23° C.): | 3,200 mPa.s |
| Ethylene oxide content: | 12.7% |
| Degree of allophanatization: | 0% |

Example 7

Preparation of Emulsions 175 g of deionized water were added to 75 g of the polyisocyanate mixture according to the invention from example 1 in a conical flask and the components were converted into a finely divided, bluish-tinged emulsion by gentle manual stirring. After a standing time of 24 h, the emulsion was still stable and showed no precipitates or sediment.

As a comparison 175 g of deionized water were added to 75 g of the polyisocyanate mixture from example 5 in a conical flask and the mixture was stirred on a magnetic stirrer at 900 rpm for 5 min. In spite of the use of higher shear forces, the resulting dispersion contained very coarse particles and had low stability as evidenced by a thick white sediment which had already formed after a standing time of 2 h.

The comparison demonstrates that the polyisocyanate mixture from example 1 prepared according to the invention had a significantly better dispersibility and at the same time a higher NCO functionality compared with a polyisocyanate mixture of having the same empirical composition and prepared in accordance with EP-B 540,985, in which the polyether chains were linked with the polyisocyanate exclusively via urethane bonds.

Example 8

Use According to the Invention 100 parts of an aqueous hydroxy-functional polyacrylate dispersion which was free from co-solvent, had a solids content of 43% and an OH content of 2.5%, based on resin solids, and substantially contained 48.0% methyl methacrylate, 27.4% n-butyl acrylate, 21.6% hydroxy-$C_3$-alkyl methacrylate (addition product of propylene oxide onto methacrylic acid) and 3.0% acrylic acid, were mixed with 0.5 parts of a commercially available defoamer (Foamaster TCX, Henkel). The formulation had an unlimited storage stability.

15.5 parts of the polyisocyanate according to the invention from example 1 were added to the this aqueous polyacrylate resin (which corresponded to an equivalent ratio of isocyanate groups to alcoholic hydroxyl groups of 1:1), and the components were homogenized by intensive stirring (2,000 rpm). The solids content was then adjusted to 40% by the addition of water.

The processing time of the ready-to-apply composition was about hours. A film applied in a wet film coating thickness of 150 µm (about 60 µm dry) appeared almost transparent with a slightly yellowish shimmer (Tyndall effect) directly after application. At room temperature, the dust dry time was less than 30 min, and the pressure dry time was about 1 to 1.5 hours. A second identical coating was dried under forced conditions (30 min/60 °C.). In each case a high gloss, completely clear and transparent coating having the following properties was obtained:

| Drying at | RT (23° C.) | 60° C. |
|---|---|---|
| Optical properties (gloss/transparency) | very good/very good | very good/very good |
| Pendulum damping after 1 d/7d | 57 s/137 s | 99 s/144 s |
| Resistance to solvents[a] | | |
| Water (30 min) | 0 | 0 |
| Isopropanol/water 1:1 (1 min) | 0 | 0 |
| MPA/xylene 1:1 (1 min) | 0 | 0 |
| Butyl glycol (1 min) | 0 | 0 |
| Acetone (1 min) | 1 | 0 |

[a]Evaluation: 0 – 5 (0 = paint film unchanged; 5 = completely dissolved)

For comparison, a paint was prepared by the process described above from 100 parts of the previously described hydroxy-functional polyacrylate dispersion and 15.8 parts of the polyisocyanate according to EP-B 540,985 from example 6. The equivalent ratio of isocyanate groups to alcoholic hydroxyl groups was 1:1.).

The processing time of the ready-to-apply composition was approx. 3 hours. The film was applied in a wet film coating thickness of 150 μm (about 60 μm dry) and looked milky-white directly after application. At room temperature, the dust dry time was approx. 1 hour, and the pressure dry time was about 2 to hours. A second coating was dried under forced conditions (30 min/60 ° C.). In both cases, slightly cloudy coatings with the following properties were obtained:

| Drying at | RT (23° C.) | 60° C. |
|---|---|---|
| Optical properties (gloss/transparency) | moderate/poor | Moderate/poor |
| Pendulum damping after 1 d/7d | 44 s/121 s | 72 s/123 s |
| Resistance to solvents[a] | | |
| Water (30 min) | 2 | 2 |
| Isopropanol/water 1:1 (1 min) | 2 | 2 |
| MPA/xylene 1:1 (1 min) | 3 | 2 |
| Butyl glycol (1 min) | 2 | 2 |
| Acetone (1 min) | 4 | 3 |

[a]Evaluation: 0 – 5 (0 = paint film unchanged; 5 = completely dissolved)

The comparison demonstrates that the polyisocyanate prepared according to the invention from example 1 with a lower content of hydrophilic ethylene oxide units had dispersible polyisocyanate prepared from the same raw materials (example 6). Because of the higher NCO content, and in particular the higher functionality of the polyisocyanate according to the invention, the coatings had a considerably higher resistance to solvents and water.

Example 9

Use According to the Invention 100 parts of an aqueous hydroxy-functional polyacrylate dispersion, which was free from co-solvent, had a solids content of 44% and an OH content of 3.0%, based on resin solids, and substantially contained 44.9% methyl methacrylate, 26.1% n-butyl acrylate, 25.9% hydroxy-$C_3$-alkyl methacrylate (addition product of propylene oxide on methacrylic acid) and 3.1% acrylic acid, were mixed with 0.5 parts of a commercially obtainable defoamer (Foamaster TCX, Henkel). The formulation had an unlimited storage stability.

22.7 parts of an 80% solution of the polyisocyanate according to the invention from example 2 in dipropylene glycol dimethyl ether were added to this aqueous polyacrylate resin (which corresponded to an equivalent ratio of isocyanate groups to alcoholic hydroxyl groups of 1:1), and the components were homogenized by intensive stirring (2,000 rpm). The solids content was then adjusted to 40% by the addition of water.

The processing time of the ready-to-apply composition was about 3 hours. A film applied in a wet film coating thickness of 150 μm (about 60 μm dry) appeared almost transparent with a slightly yellowish shimmer (Tyndall effect) after application. At room temperature, the dust dry time was about 1 h, and the pressure dry time was about 2 to 3 hours. A second identical coating was dried under forced conditions (30 min/60° C.). In both cases a high gloss, completely clear and transparent coating having the following properties was obtained:

| Drying at | RT (23° C.) | 60° C. |
|---|---|---|
| Optical properties (gloss/transparency) | very good/very good | Very good/very good |
| Pendulum damping after 1 d/7d | 88 s/144 s | 118 s/157 s |
| Resistance to solvents[a] | | |
| Water (30 min) | 0 | 0 |
| Isopropanol/water 1:1 (1 min) | 0 | 0 |
| MPA/xylene 1:1 (1 min) | 0 | 0 |
| Butyl glycol (1 min) | 0 | 0 |
| Acetone (1 min) | 1 | 0 |

[a]Evaluation: 0 – 5 (0 = paint film unchanged; 5 = completely dissolved)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water dispersible polyisocyanate mixture prepared from an aliphatic, cycloaliphatic, araliphatic and/or aromatic diisocyanate and having
   a) an average isocyanate functionality of at least 2.0,
   b) a content of 5.0 to 25.0 wt. %, based on resin solids, of isocyanate groups (calculated as NCO; molecular weight=42) and
   c) a content of 2 to 50 wt. %, based on resin solids, of ethylene oxide units (calculated as $C_2H_4O$; molecular weight 44) incorporated within polyether chains containing an average of 5 to 35 ethylene oxide units,
wherein at least 60 mole % of the polyether chains are connected via allophanate groups to two polyisocyanate molecules which are each prepared from at least two diisocyanate molecules.

2. The polyisocyanate mixture of claim 1 which is prepared from an aliphatic and/or cycloaliphatic diisocyanate and has
   a) an average isocyanate functionality of 2.3 to 9.9,
   b) a content of 6.0 to 22.5 wt. %, based on resin solids, of isocyanate groups and
   c) a content of 5 to 40 wt. %, based on resin solids, of ethylene oxide units incorporated within polyether chains containing an average of 7 to 30 ethylene oxide units.

3. The polyisocyanate mixture of claim 1 wherein said two polyisocyanate molecules contain isocyanurate groups.

4. The polyisocyanate mixture of claim 2 wherein said two polyisocyanate molecules contain isocyanurate groups.

5. The polyisocyanate mixture of claim 1 wherein at least 80 mole % of the polyether chains are connected via allophanate groups to two polyisocyanate molecules containing isocyanurate groups, which are each prepared from at least two diisocyanate molecules containing aliphatically and/or cycloaliphatically bound isocyanate groups.

6. The polyisocyanate mixture of claim 2 wherein at least 80 mole % of the polyether chains are connected via allophanate groups to two polyisocyanate molecules containing isocyanurate groups, which are each prepared from at least two diisocyanate molecules containing aliphatically and/or cycloaliphatically bound isocyanate groups.

7. A process for the preparation of a water dispersible polyisocyanate mixture having a) an average isocyanate functionality of at least 2.0, b) a content of 5.0 to 25.0 wt. %, based on resin solids, of isocyanate groups (calculated as NCO; molecular weight=42) and c) a content of 2 to 50 wt. %, based on resin solids, of ethylene oxide units (calculated as $C_2H_4O$; molecular weight 44) incorporated within polyether chains containing an average of 5 to 35 ethylene oxide units, which comprises reacting at an NCO/OH equivalent ratio of 6:1 to 400:1

A) a polylsocyanate component containing polyisocyanate molecules prepared from at least two aliphatic, cycloaliphatic, araliphatic and/or aromatic diisocyanate molecules and having an average NCO functionality of 2.0 to 5.0 and having a content of aliphatically, cycloaliphatically, araliphatically and/or aromatically bound Isocyanate groups (calculated as NCO; molecular weight=42) of 8.0 to 27.0 wt. % and a content of monomeric diisocyanates of less than 1 wt. % with B) a monofunctional polyalkylene oxide polyether alcohol containing an average of 5 to 35 ethylene oxide units, and converting sufficient urethane groups initially formed by the NCO/OH reaction to allophanate groups, such that at least 60 mole % of the polyether chains are connected via allophanate groups to two polyisocyanate molecules which are each prepared from at least two dilsocyanate molecules.

8. The process of claim 7, wherein

A) said polyisocyanate component has an average NCO functionality of 2.3 to 4.5, a content of aliphatically and/or cycloaliphatically bound isocyanate groups of 14.0 to 24.0 wt. % and a content of monomeric diisocyanates of less than 0.5 wt. % and B) a monofunctional polyalkylene oxide polyether alcohol containing a statistical average of 7 to 30 ethylene oxide units, and wherein components A) and B) are reacted at an NCO/OH equivalent ratio of 8:1 to 140:1.

9. The process of claim 7 wherein polyisocyanate A) contains isocyanurate groups and prepared from 1,6-diisocyanatohexane, 1-isocyanato-3,3,5-trimethyl-5-isocyanatomethylcyclohexane and/or 4,4'-diisocyanatodicyclohexylmethane.

10. The process of claim 8 wherein polyisocyanate A) contains isocyanurate groups and prepared from 1,6-diisocyanatohexane, 1-isocyanato-3,3,5-trimethyl-5-isocyanatomethylcyclohexane and/or 4,4'-diisocyanatodicyclohexylmethane.

11. The process of claim 7 wherein components A) and B) are reacted in the presence of a catalyst which accelerates the formation of allophanate groups.

12. The process of claim 8 wherein components A) and B) are reacted in the presence of a catalyst which accelerates the formation of allophanate groups.

13. The process of claim 11 wherein said allophanatization catalyst comprises an organic zinc compound.

14. The process of claim 12 wherein said allophanatization catalyst comprises an organic zinc compound.

15. The process of claim 11 wherein said allophanatization catalyst comprises zinc(II) n-octoate, zinc(II) 2-ethyl-1-hexanoate and/or zinc(II) stearate.

16. The process of claim 12 wherein said allophanatization catalyst comprises zinc(II) n-octoate, zinc(II) 2-ethyl-1-hexanoate and/or zinc(II) stearate.

* * * * *